(12) United States Patent
Vrooman et al.

(10) Patent No.: US 11,860,776 B2
(45) Date of Patent: *Jan. 2, 2024

(54) CONCURRENT MEMORY RECYCLING FOR COLLECTION OF SERVERS

(71) Applicant: Oracle International Corporation, Redwood Shores, CA (US)

(72) Inventors: Tyler Vrooman, Seattle, WA (US); Graham Schwinn, Woodinville, CA (US); Greg Edvenson, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,377

(22) Filed: Jan. 27, 2023

(65) Prior Publication Data

US 2023/0168998 A1 Jun. 1, 2023

Related U.S. Application Data

(63) Continuation of application No. 16/884,002, filed on May 26, 2020, now Pat. No. 11,609,845.
(Continued)

(51) Int. Cl.
*G06F 12/00* (2006.01)
*G06F 13/00* (2006.01)
(Continued)

(52) U.S. Cl.
CPC ........ *G06F 12/0246* (2013.01); *G06F 9/4403* (2013.01); *G06F 12/0638* (2013.01);
(Continued)

(58) Field of Classification Search
CPC ............ G06F 12/0246; G06F 12/0638; G06F 9/4403; G06F 12/0646; G06F 21/79; G06F 2221/2143
(Continued)

(56) References Cited

U.S. PATENT DOCUMENTS 4,965,717 A * 10/1990 Cutts, Jr. .............. G06F 11/0724
714/48
4,993,017 A * 2/1991 Bachinger ........... G06F 9/45533
370/360
(Continued)

*Primary Examiner* — Sheng Jen Tsai
(74) *Attorney, Agent, or Firm* — Trellis IP Law Group, PC; Lisa Benado

(57) ABSTRACT

The present memory restoration system enables a collection of computing systems to prepare inactive rewritable memory for reserve and future replacement of other memory while the other memory is active and available for access by a user of the computing system. The preparation of the reserved memory part is performed off-line in a manner that is isolated from the current user of the active memory part. Preparation of memory includes erasure of data, reconfiguration, etc. The memory restoration system allows for simple exchange of the reserved memory part, once the active memory part is returned. The previously active memory may be concurrently recycled for future reuse in this same manner to become a reserved memory. This enables the computing collection infrastructure to "swap" to what was previously the inactive memory part when a user vacates a server, speeding up the server wipe process.

20 Claims, 7 Drawing Sheets

Related U.S. Application Data

(60) Provisional application No. 62/853,667, filed on May 28, 2019.

(51) Int. Cl.

| | |
|---|---|
| *G06F 12/02* | (2006.01) |
| *G06F 9/4401* | (2018.01) |
| *G06F 12/06* | (2006.01) |
| *G06F 21/79* | (2013.01) |

(52) U.S. Cl.
CPC .......... *G06F 12/0646* (2013.01); *G06F 21/79* (2013.01); *G06F 2221/2143* (2013.01)

(58) Field of Classification Search
USPC ....................................................... 711/154
See application file for complete search history.

(56) References Cited

U.S. PATENT DOCUMENTS

| | | | | | |
|---|---|---|---|---|---|
| 5,295,258 | A * | 3/1994 | Jewett | ............... | G06F 11/20 714/E11.138 |
| 5,317,726 | A * | 5/1994 | Horst | ............... | G06F 11/0724 714/37 |
| 5,317,752 | A * | 5/1994 | Jewett | ............... | G06F 11/2015 714/24 |
| 5,327,553 | A * | 7/1994 | Jewett | ............... | G06F 11/1683 714/E11.138 |
| 5,384,906 | A * | 1/1995 | Horst | ............... | G06F 15/17 713/375 |
| 5,434,562 | A * | 7/1995 | Reardon | ............... | G06F 21/80 713/193 |
| 5,664,195 | A * | 9/1997 | Chatterji | ............... | G06F 9/4411 719/321 |
| 5,774,841 | A * | 6/1998 | Salazar | ............... | G10L 15/22 704/E15.04 |
| 5,809,415 | A * | 9/1998 | Rossmann | ............... | H04L 69/329 370/383 |
| 5,890,003 | A * | 3/1999 | Cutts, Jr. | ............... | G06F 11/1658 710/263 |
| 5,911,485 | A * | 6/1999 | Rossmann | ............... | H03K 17/94 341/23 |
| 5,986,718 | A * | 11/1999 | Barwacz | ............... | H04N 9/75 348/592 |
| 6,480,941 | B1 * | 11/2002 | Franke | ............... | G06F 12/0284 711/E12.013 |
| 7,346,757 | B2 * | 3/2008 | Hass | ............... | H04L 49/00 711/163 |
| 7,577,871 | B2 * | 8/2009 | Largman | ............... | G06F 21/575 714/38.14 |
| 7,856,278 | B2 * | 12/2010 | Okeda | ............... | G05B 19/058 700/19 |
| 9,313,643 | B1 * | 4/2016 | Ghoshal | ............... | H04W 8/02 |
| 9,853,928 | B2 * | 12/2017 | Dabbiere | ............... | H04W 4/02 |
| 10,922,469 | B1 * | 2/2021 | Pei | ............... | G06F 30/31 |
| 11,609,845 | B2 * | 3/2023 | Vrooman | ............... | G06F 9/5011 |
| 11,650,749 | B1 * | 5/2023 | Tran, V | ............... | G06F 3/0622 711/165 |
| 2002/0083432 | A1 * | 6/2002 | Souissi | ............... | H04B 1/0003 717/178 |
| 2002/0191998 | A1 * | 12/2002 | Cremon | ............... | B41J 5/30 400/70 |
| 2004/0210796 | A1 * | 10/2004 | Largman | ............... | G06F 11/1469 714/E11.133 |
| 2004/0236874 | A1 * | 11/2004 | Largman | ............... | G06F 21/71 710/8 |
| 2006/0180667 | A1 * | 8/2006 | Sanchez-Olea | ...... | H01S 5/06832 235/454 |
| 2006/0259785 | A1 * | 11/2006 | Thibadeau | ............... | G06F 21/80 713/193 |
| 2007/0265972 | A1 * | 11/2007 | Tsutsui | ............... | G06Q 30/06 705/52 |
| 2008/0028045 | A1 * | 1/2008 | Bealkowski | ........ | H04L 41/0803 709/219 |
| 2009/0055831 | A1 * | 2/2009 | Bauman | ............... | G06F 9/5077 718/104 |
| 2009/0089460 | A1 * | 4/2009 | Komoda | ............... | G06F 12/1458 710/13 |
| 2009/0216921 | A1 * | 8/2009 | Saito | ............... | G06F 12/1475 710/39 |
| 2009/0263126 | A1 * | 10/2009 | Mercier | ............... | H04B 10/25891 398/33 |
| 2010/0005531 | A1 * | 1/2010 | Largman | ............... | G06F 21/53 726/24 |
| 2010/0281252 | A1 * | 11/2010 | Steeves | ............... | G06F 21/72 713/155 |
| 2011/0078358 | A1 * | 3/2011 | Shebanow | ............... | G06F 12/1045 711/3 |
| 2011/0269494 | A1 * | 11/2011 | Kobayashi | ............... | H04W 36/30 455/509 |
| 2012/0092379 | A1 * | 4/2012 | Tsuji | ............... | G06Q 10/10 345/660 |
| 2013/0048720 | A1 * | 2/2013 | Lewis | ............... | G07C 9/253 235/382 |
| 2013/0218931 | A1 * | 8/2013 | Lewis | ............... | G06Q 10/00 707/803 |
| 2013/0262748 | A1 * | 10/2013 | Chang | ............... | G06F 12/145 711/E12.016 |
| 2014/0173753 | A1 * | 6/2014 | Sanso | ............... | H04L 63/104 726/28 |
| 2014/0229674 | A1 * | 8/2014 | Wiacek | ............... | G06F 3/0634 711/115 |
| 2014/0310484 | A1 * | 10/2014 | Giroux | ............... | G06F 12/109 711/170 |
| 2014/0333412 | A1 * | 11/2014 | Lewis | ............... | G07C 9/22 340/5.2 |
| 2015/0104013 | A1 * | 4/2015 | Holman | ............... | H04L 63/061 380/243 |
| 2015/0120779 | A1 * | 4/2015 | Lin | ............... | G06F 21/6227 707/783 |
| 2016/0179432 | A1 * | 6/2016 | Niwa | ............... | G06F 3/0638 711/203 |
| 2016/0232125 | A1 * | 8/2016 | Han | ............... | G06F 16/40 |
| 2016/0246542 | A1 * | 8/2016 | Salah | ............... | G11C 11/4087 |
| 2016/0269471 | A1 * | 9/2016 | Tsao | ............... | B66C 1/442 |
| 2016/0293244 | A1 * | 10/2016 | Mohammad | ......... | G11C 11/409 |
| 2016/0300600 | A1 * | 10/2016 | Mohammad | ......... | G11C 11/4072 |
| 2016/0357981 | A1 * | 12/2016 | Tzeng | ............... | G06F 21/629 |
| 2016/0371496 | A1 * | 12/2016 | Sell | ............... | G06F 21/604 |
| 2016/0378353 | A1 * | 12/2016 | Schmisseur | ........... | G06F 3/0604 711/114 |
| 2017/0046342 | A1 * | 2/2017 | Azgin | ............... | H04L 45/748 |
| 2017/0279667 | A1 * | 9/2017 | Culter | ............... | H04L 43/0811 |
| 2017/0371809 | A1 * | 12/2017 | Benedict | ............... | G06F 12/1408 |
| 2018/0239323 | A1 * | 8/2018 | Walbroel | ............... | G05B 19/0426 |
| 2018/0246773 | A1 * | 8/2018 | Kimura | ............... | G06F 9/526 |
| 2018/0268027 | A1 * | 9/2018 | Gold | ............... | G06F 12/0815 |
| 2019/0012769 | A1 * | 1/2019 | Arrieta | ............... | H04L 67/04 |
| 2019/0196994 | A1 * | 6/2019 | Mitra | ............... | G06F 13/4022 |
| 2019/0303028 | A1 * | 10/2019 | Rawal | ............... | G06F 3/0604 |
| 2019/0332792 | A1 * | 10/2019 | Kunii | ............... | G06F 21/604 |
| 2019/0370070 | A1 * | 12/2019 | Houlbert | ............... | G06F 9/52 |
| 2020/0226110 | A1 * | 7/2020 | Namioka | ............... | G06F 16/278 |

* cited by examiner

CONCURRENT MEMORY RECYCLING FOR COLLECTION OF SERVERS

CROSS REFERENCES TO RELATED APPLICATIONS

This application is a continuation of U.S. patent application Ser. No. 16/884,002, entitled CONFIGURABLE MEMORY DEVICE CONNECTED TO A MICROPROCESSOR, filed on May 26, 2020, which claims the benefit of the following application, U.S. Patent Provisional Application Ser. No. 62/853,667, entitled CONFIGURABLE MEMORY DEVICE CONNECTED TO A MICROPROCESSOR, filed on May 28, 2019, which are hereby incorporated by reference as if set forth in full in this application for all purposes.

BACKGROUND

Data centers provide centralized locations for concentrating computing and networking equipment for users to access, consume, and store large amounts of data. Often in collections of computing systems, e.g. cloud computing systems, common resources such as processors and memory are configured for different users to utilize in turn. Such computing collections utilize rewritable memory, e.g. flash memory, that can be erased once one user is done with it and rewritten for a next user. For example, a cloud service provider must ensure that when a new user begins accessing a cloud resource, the resource is configured properly for a subsequent user and any information from a prior user is unavailable.

In some cloud systems, a hardware wipe of all memory may be required in order to protect the integrity of a user's activity on the cloud. Such erasing of data can require a substantial amount of time to ensure complete removal of the data. Additional time is spent configuring the memory for reuse by rewriting any start-up data. The period to expunge old data and reconfigure a cloud resource for a next user is overhead time during which the resource is not available to any user. It is desirable to reduce or minimize the amount of time spent recycling memory.

SUMMARY

Implementations of this application relate to systems for concurrent recycling of memory for future use. In some implementations, an apparatus in a collection of computing systems is provided to prepare memory for reuse. The apparatus includes a first memory part that is accessible to a first client device of a first user during a usage period of the first user. A service processor is coupled to a switch and is in communication with the first memory during the usage period. A root of trust processor is coupled to the switch. The root of trust processor is inaccessible to the first client device of the first user during the usage period. The apparatus further includes a second memory part that is inaccessible to the first client device of the first user during the usage period of the first user. One or more control signals are provided to trigger the root of trust processor to prepare the second memory part for deployment while the service processor is in communication with the first memory part. The first and second memory parts may be flash memory.

In some implementations, the root of trust processor is configured to prepare the second memory part by erasing data from a previous user of the second memory, such as returning the second memory to an initial factory state. The root of trust processor may also prepare the second memory part by reconfiguring the second memory part for use by a second user.

In some aspects, the apparatus may further comprise a connector coupled to the root of trust processor and the switch. The root of trust processor may transmit signals via the connector, to instruct the switch to swap access of the service processor and the root of trust with the first memory part and second memory part. In some implementations, the switch may have multiple input lines and multiple output lines.

In yet some implementations, a method to provide memory for reuse in a cloud computing system includes enabling communication of a root of trust processor to a first memory returned after a first user ended access to the first memory through a service processor in the cloud computing system. The root of trust processor prepares the first memory for future use, while the service processor is enabled to communicate with a second memory for a second user to access, and while the root of trust processor is disabled from communicating with the second memory. A switch signal is generated to trigger exchange of communication of the service processor and the root of trust with the first memory and second memory. For example, the root of trust may send the switch signal to a switch component.

Various implementations and examples of the method are described. For example, the exchange of communication may comprise enabling the service processor to communicate with the first memory, disabling the service processor to communicate with the second memory, enabling the root of trust processor to communicate with the second memory, and disabling the root of trust processor to communicate with first memory.

In some implementations, access by the first user to the first memory is ended in response to receiving an indication that a usage period ended for the second user to access the second memory through the service processor.

In some implementations, preparation of the first memory includes erasing data from the first user, such as returning the second memory to an initial factory state. The preparation may also include configuring the first memory for a subsequent user.

In still some implementations, a cloud computing system having a memory restoration system for concurrent recycling of memory is provided. The cloud computing system includes a service front end and a restoration back end. The service front end includes a service processor that is accessible to a first client device of a first tenant user during a usage period of the first tenant user, and a first memory part that is accessible to the first client device of the first tenant user during the usage period of the first tenant user. The restoration back end includes a second memory part that is inaccessible to the first client device of the first tenant user during the usage period of the first user, and a root of trust processor to prepare, while the service processor is in communication with the first memory part, the second memory part for future deployment. The root of trust processor is inaccessible to the first client device of the first tenant user. The cloud computing system also includes a switch coupled to the service front end and the restoration back end. The switch is configured to respond to switch signals from the root of trust processor to swap access of the service processor and the root of trust with the first memory and second memory.

In some implementations, the root of trust processor prepares the second memory part by erasing data from a previous user of the second memory part. The erasing of data may include returning the second memory part to an initial factory state. The root of trust processor may also prepare the second memory part by reconfiguring the second memory part for use by a second tenant user.

In some aspect of the cloud computing system, a connector is coupled to the root of trust processor and the switch. The root of trust processor may transmit signals via the connector, to instruct the switch to swap access of the service processor and the root of trust with the first memory part and second memory part.

BRIEF DESCRIPTION OF THE DRAWINGS

The disclosure is illustrated by way of example, and not by way of limitation in the figures in which like reference numerals are used to refer to similar elements.

FIG. 1a shows a reserved memory in preparation for reuse and FIG. 1b shows the prepared reserved memory placed into use, in accordance with some implementations.

DETAILED DESCRIPTION OF EMBODIMENTS

Figure 1A:
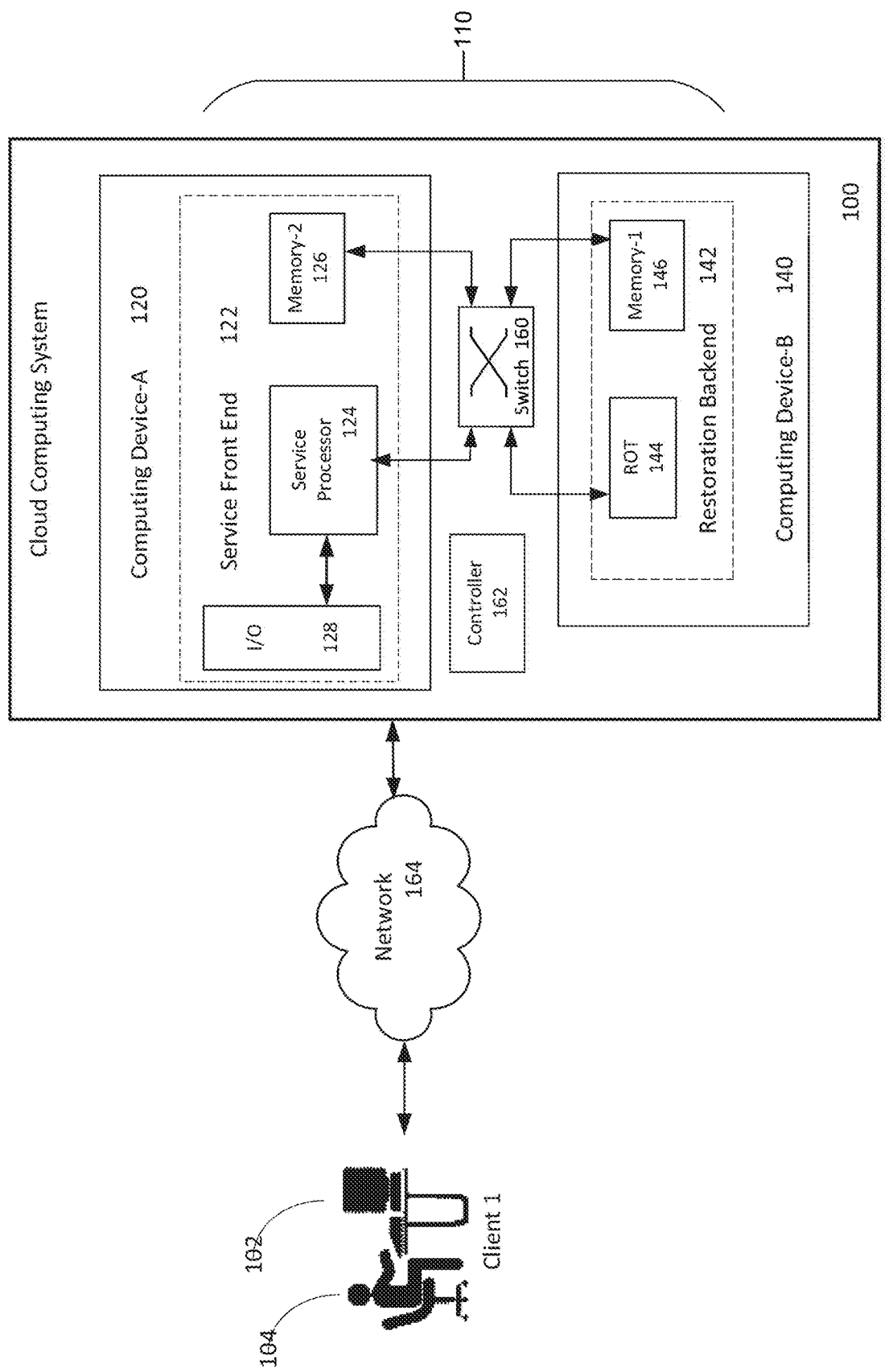
FIGS. 1a and 1b are conceptual diagrams illustrating example environments in which various aspects of a memory restoration system can be implemented, where

The present memory restoration system enables a collection computing systems to prepare inactive rewritable memory for reserve and for future replacement of other memory. The preparation occurs while the other memory is active and available for access by a user of the computing system. The preparation of the reserved memory part is performed off-line at the computing system in a manner that is isolated from the current user of the active memory part. Preparation of memory includes erasure of data, reconfiguration, etc. The memory restoration system allows for simple exchange of the reserved memory part, once the active memory part is returned. In some implementations, the previously active memory may be concurrently recycled for future reuse in this same manner to become a reserved memory.

In some implementations, a collection of computing devices, e.g. servers, may incorporate the memory restoration system in a cloud computing environment. The computing devices used in a cloud computing system include more memory and powerful components such as a robust operating system, than an individual client device, e.g. workstation. The cloud computing system may include various types of servers, such as bare metal instances without a hypervisor.

A service processor is configured to switch between using one of two memory parts, e.g. two flash memories. While the service processor is connected to and using a current memory part, a root of trust processing unit (ROT) can configure the "inactive" memory part in the background concurrent with a user resident on a server, for example, in a cloud service application. The inactive memory part is disabled from being connecting with the service processor during the preparation phase. The cloud infrastructure may "swap" to what was previously the inactive memory part when a user vacates the server. The concurrent recycling process of the present memory restoration system may results in substantial speeding up of the server preparation process. Exchange of memory parts occurs by use of electrical connections, taking milliseconds to a few seconds to complete the swap.

The computing device accessed by a user is provisioned with clean firmware. Preparation of the reserved memory part running in the background may include erasing data from a previous user of the reserved memory part, to wipe clean the reserved memory part, e.g. restored to factory settings. In some instances, this preparation phase may also include reading data stored in the reserved memory part to confirm that no bits have changed while the previous user was resident on the system.

The preparation phase may also include reconfiguring the reserved memory part for use by a subsequent user. Reconfiguration may require that a startup or boot memory be written with appropriate data to initiate an environment or task of the subsequent user. For example, the root of trust may prepare a fresh software image that is booted onto the cleaned flash memory before the prepared memory is handed over to the service processor for a next user. The fresh image may be from a previously prepared memory device. Thus, the preparation process may be continuously flip-flopping memory parts.

A user, e.g., end user, as referred to in this description, may be any person or entity designated to have available access to a given service processor and an active memory device, in which the active memory device is preconfigured for the user's needs. For example, the user may be a tenant of a server space in a multi-tenant cloud architecture, where the tenant is isolated and invisible to other tenants of other cloud resources. In some implementations, a user may also be a tenant of a single-tenant cloud system. For example, a user may be a customer who is currently using, e.g., assigned to, a server. The user may be an authorized group of persons, one or more entities, e.g. enterprise or groups within an enterprise (including a business, university, government, military, etc.) or individual person.

The service processor and active memory may be dedicated to the assigned user during a usage period of time in which a user is designated as having available access to allocated computer resources. For example, a usage period may initiate with a user being granted access to assigned computer resources, e.g. a given service processor and associated memory, and terminate when the user relinquishes the allocated computer resources. The usage period may be defined by a customer agreement, a duration time of a particular project, during an employment or contract term, etc.

Although features may be described with respect to specific types of resources or operations, e.g., system flash memory, the features described herein may be applicable to other cloud computing resources and operations. Furthermore, while cloud computing is one example of a computing system described, where the memory restoration system may be implemented by a motherboard, the present memory restoration system may be employed in other computing environments in which a memory device or other electronic hardware is updated in the background. For example, network cards, hard drives, etc. may be updated without interfering with currently executing software.

The memory restoration system may be employed for an update of a memory, such as a memory image that would typically take a long time to load because include much data, The update may be run in the background with a second memory while a first memory is being used by a user of the computer device. The device may be then rebooted to load the updated second memory, where the two memories are of the same type, e.g. flash memory. Thus, one memory is not, for example persistent memory, and the other memory being random access memory. Additionally, the memory restoration system may also enable forensics to be performed on an inactive memory part, for example, where it is suspected that the memory part had been tampered with, such as by an authorized user.

It is customary to configure a single flash memory device to attach to service processors for a user. Erasing of the flash memory can consume much downtime during which the system is inoperable. To compensate for the slow erase/write cycles, some systems have attempted to speed up the physical communication bus between the service processor and the flash memory part such that communication is sped up to the flash memory part.

Another attempted solution has been to logically split the memory that is being used by the service processor into portions, e.g. two halves, and to update one portion, e.g. one half, while executing off of the other portion(s). However, this split memory approach may impose security risks since the currently executing service processor software may be considered untrusted once a user is resident on the server.

The present memory restoration system provides a security benefit by isolating the preparation of the reserve memory part through a switch restricting the service processor and the resident user access to the reserve memory until the reserve memory is ready to be deployed.

With the present memory restoration system, the recycle time of a computer resource is greatly reduced. A next user for the computer resource need not wait for the computer resource to be prepared, e.g. data erased, after a previous user is done with the computer resource. The wipe time experienced by a user switchover can be reduced by configuring time-consuming portions of a memory wipe for the next user, concurrent with the service processor's accessing a separate active memory for a current resident user. The memory restoration system adds to the elasticity of a fleet of servers to accommodate increasing customer demands and avoid potentially thousands of offline servers at any given time waiting for recycling.

In some implementations, in order to reduce the amount of time before a next user can begin using a service processor, two or more physical sections of memory are maintained. While the service processor is being used by a present user, a second section of memory (e.g., flash memory, or other) is accessed by a root of trust processing unit (ROT). The ROT may be dedicated to the jobs of preparation of reserved memory and replacement, e.g. reinstalling, of the prepared reserved memory. In some implementations, the ROT can include a separate piece of hardware and firmware that is trusted by not being accessible to a user. Between user tenancies the ROT is used to securely wipe any memory to be used by a service processor.

In some implementations, the ROT or any other type of processing facility may be used to provide other functions. For example, the ROT may sanitize, load and/or verify data for a next user. Then, when it is time for a new user to begin operations on the cloud resources, the service processor is put into communication with the prepared memory section and can begin processing without waiting for the most recently used memory section to be wiped or otherwise configured.

In illustration of a usage example shown in FIG. 1a, a memory preparation stage is shown in the context of a cloud computing system 100, in which a reserve memory, memory-1 146, is prepared for reuse. The cloud computing system 100 includes with a memory restoration system 110 having a service front end 122 of computing device-A 120 and a restoration back end 142 of computing device-B 140. According to one implementation, the memory restoration system 110 may be employed to prepare memory-1 146, while memory-2 126 is accessed through I/O port 128 by a client device 102 of a user 104 across network 164 via a router (not shown) of the cloud computing system 100.

FIG. 1a shows an instance of the memory restoration system 110 that includes service front end 122 accessible to client device 102, with a service processor 124 and memory-2 126. The memory restoration system 110 includes restoration back end 140 inaccessible to client device 102, with a ROT processing unit 144 and memory-1 146. The client device may be a variety of heterogeneous devices, such as a desktop, laptop, tablet, smartphone, thin client, etc.

In some implementations, the computing device-A 120 and computing device-B 140 may be server devices. For example, computing device-A 120 may be a bare metal type server in which the user has access to much of the computing device-A 120 except for particular locked down components. In other implementations, computing device-A 120 and computing device-B 140 are not distinct devices but virtualization machines, for example, managed by Hypervision software. In some implementations, the server is a large scale blade server.

The service processor 124 may be any microprocessor that the user device 102 may connect to and perform functions. For example, in some implementations, the service processor may include an Oracle Integrated Lights Out Manager (ILOM) embedded in the computing device-A 120. Servers may include various types of service processors such as high performance processors, e.g., Intel XEON and AMD EPYC processors, etc. In some implementations, the service processor may include a baseboard management controller (BMC). Other types of service processers (including general purpose, custom, bitslice or other processors) or processing systems or resources may be used. The BMC may monitor the physical state of a server using sensors and communicate with a system administrator through a special management connection.

A switch 160 selectively connects the memory-1 146 and memory-2 126 to the ROT and service processor, respectively. The switch may include various types, such as a multiplexer, a collection of switches, e.g. a crossbar switch having multiple input and output lines, etc. A computing system controller 162 may control various aspects of the memory restoration system 110. The controller may send signals to the ROT to prepare memory-1 146 for deployment. The control signals may trigger the ROT to prepare and configure memory-1 146 while the service processor 124 is in communication with memory-2 126.

In some implementations, one or more switch signals are sent from the ROT to the switch to instruct the switch 160 to selectively connect or disconnect the ROT and/or service processor to the memory-2 126 or memory-1 146. The switch signal may be a single signal to apply a voltage or not to apply a voltage. In some implementations, the switch signal may be sent from the ROT through a virtual wire, a physical wire, or other signal transmission media. In some implementations, the switch signal may also be sent by other sources, such as controller 162. In still some implementations, the switch signal may be a physical component to flip the switch 160.

For simplicity, a single client device 102 and computing devices 120, 140 are shown in FIG. 1a. The cloud computing system 100 may include a vast collection of computing devices 120, 140 and offers the ability of scaling to concurrently serve many client devices 102 of numerous users 104. In addition, although FIG. 1a depicts one memory part being prepared by the ROT, in some implementations, the ROT may simultaneously or sequentially prepare multiple reserve memories for future deployment.

Cloud computing system 100 may be a public, private, virtual private, multi-cloud, or personal cloud system, or combinations thereof, running a variety of services, such as platform as a service (PaaS), infrastructure as a service (IaaS), etc. Although the memory restoration system 110 is shown in FIG. 1a in the context of the cloud computing system 100, the memory restoration system 110 may be employed with substantially the same components in other computing systems and applications that may benefit from swapping of memory parts that involves reduced downtime.

Memory-1 146 and memory-2 126 may be any rewritable memory suitable for storage and communication with the service processor 124 and ROT processing unit 144, such as flash memory. Memory-1 146 and memory-2 126 are typically the same type of rewritable memory, e.g. flash memory. Although memory-1 146 and memory-2 126 are shown as members of computing devices 120, 140 respectively, the memory may be also located remote from the computing devices 120, 140. For example, memory-1 146 and memory-2 126 may be virtualization memory decoupled from the servers (computing devices 120, 140) by a virtualization manager, e.g. Hypervision software.

Figure 1B:
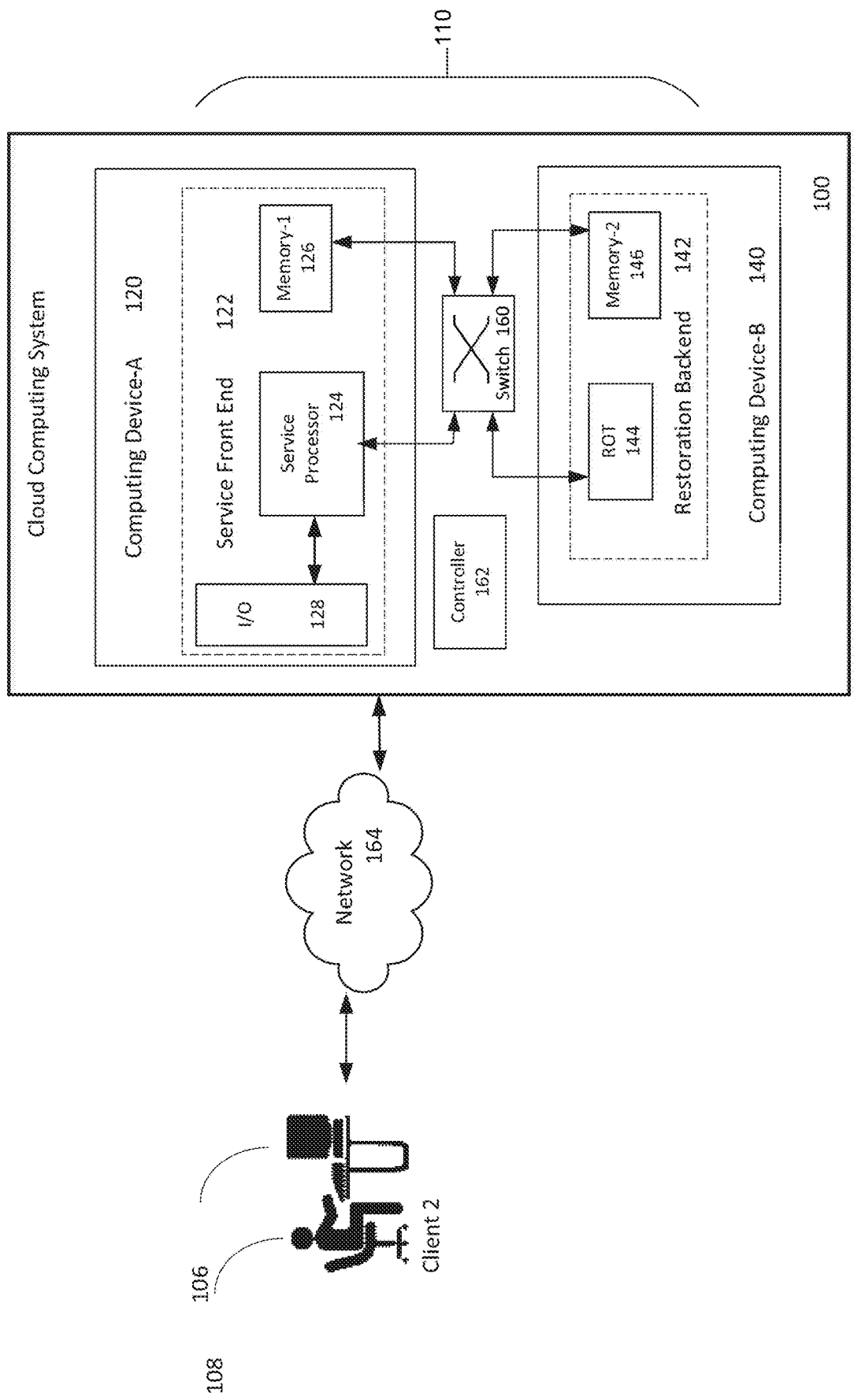

In further illustration of the usage example of FIG. 1a, FIG. 1b shows a replacement stage of the cloud computing system 100, in which a fully prepared memory-1 146 is swapped with memory-2 126 for reuse of memory-1 146 with the service processor 124. During the replacement stage, the switch 160 may receive one or more signals, such as from ROT 144 triggering the switch 160 to change connections. Through the change of switch connections ROT 144 gains communication access to the memory-2 126 and the service processor 124 loses access to memory-2 126. Likewise, ROT 144 loses connection capabilities with memory-1 146 and service processor 124 gains communication access to memory-2 126. A new user device 106 of a subsequent user 108 different from a most recent prior user, may connect to memory-1 146 while memory-2 126 is prepared for reuse in the background.

During the replacement phase, the ROT may trigger a power cycle of the hardware host, e.g. the server to be used by a tenant user, and prompt for the installation of known firmware. The ROT may receive confirmation from the hardware host that the process has been performed as expected. The preparation and replacement phases of firmware installation reduces the risk from firmware-based attacks, such as a permanent denial of service (PDoS) attack or attempts to embed backdoors in the firmware to steal data or make it otherwise unavailable.

Figure 2:
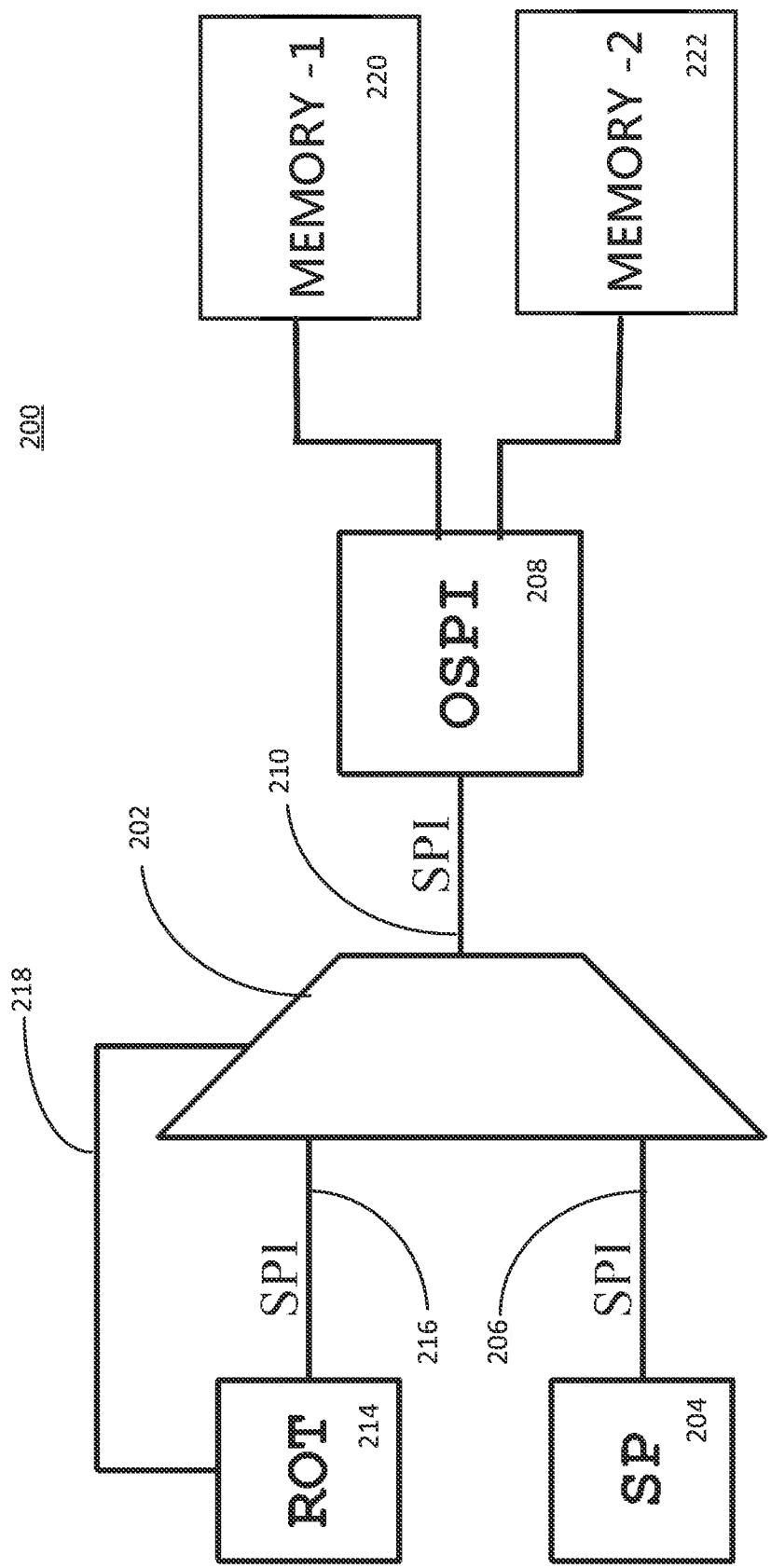
FIG. 2 is a block diagram of an exemplary memory restoration system that incorporates a multiplexer to selectively connect a root of trust processing unit and a service processor coupled to an operational serial peripheral interface, in accordance with some implementations.

Some implementations of the memory restoration system 200, as shown in an example in FIG. 2, may include a multiplexer switch 202. A service processor (SP) 204 is selectively coupled through a serial peripheral interface (SPI) 206 via and the multiplexer switch 202 to operational serial peripheral interface (OSPI) 208 through SPI 210. An ROT 214 is selectively coupled through a serial peripheral interface (SPI) 216 via and the multiplexer switch 202 to OSPI 208. The OSPI 208 enables communication with a flash memory system including memory-1 220 accessed by ROT 214 and memory-2 222 accessed by SP 204.

In some implementations, only certain steps or operations in a preparation phase may need to be pre-configured in order to provide time savings or other beneficial results. A connector 218 may provide a dedicated path for one or more signals generated by the ROT 214 to be transmitted to the switch. The connector 218 may be a virtual wire to bind the ROT 214 with the multiplexer switch 202.

Figure 3:
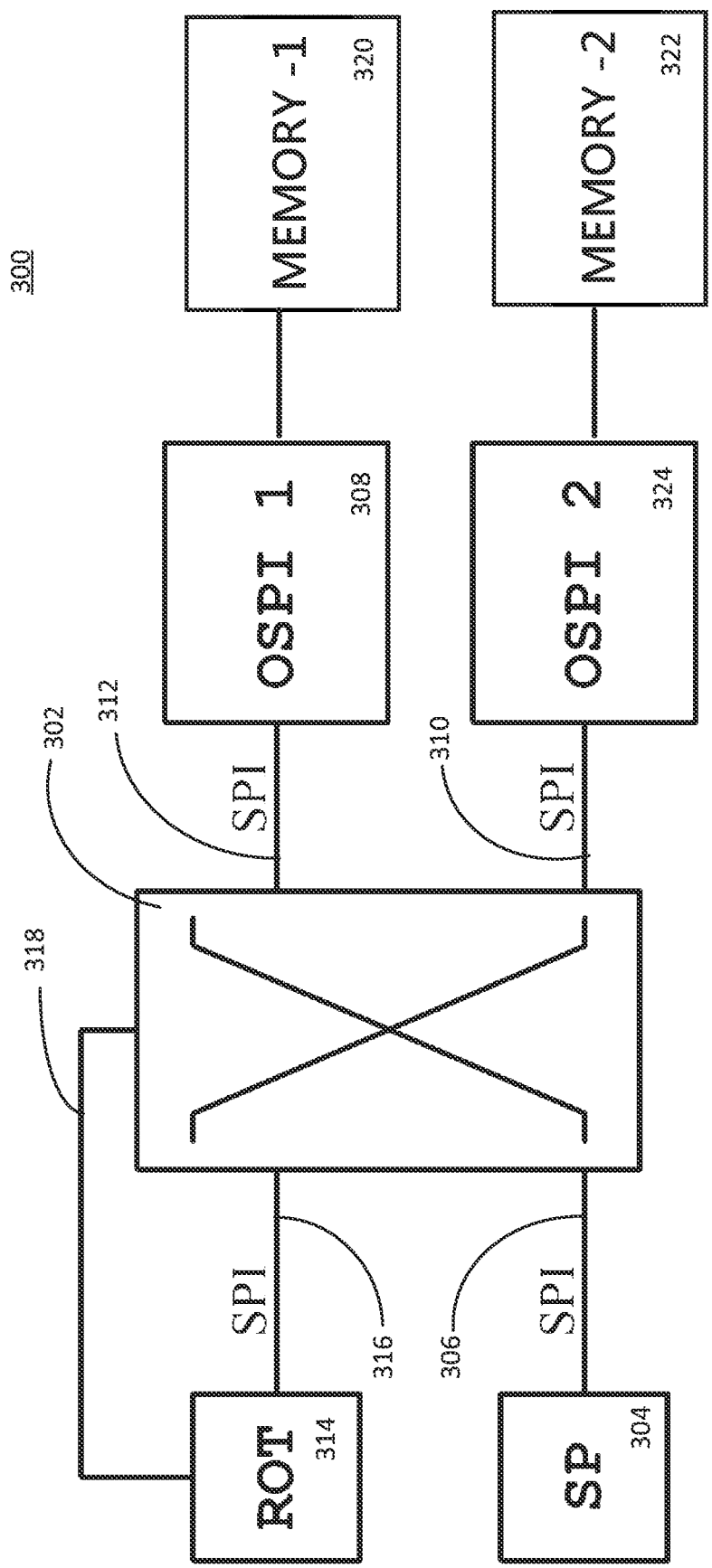
FIG. 3 is a block diagram of an exemplary memory restoration system that incorporates a crossbar switch to selectively connect a root of trust processing unit and a service processor coupled to one of two operational serial peripheral interfaces, in accordance with some implementations.

FIG. 3 shows a diagram illustrating an implementation of the memory reservation system 300 for configuring a reserved memory, e.g. memory-1 320 while concurrently allowing a service processor 304 to access an active memory, e.g. memory-2 322. Once the reserved memory is prepared, the memory reservation system switches via crossbar switch 302, the service processor 304 to the reserved memory, e.g. memory-1 320.

A crossbar switch 302 allows ROT 314 or SP 304 to selectively be connected to either a memory-1 320 or memory-2 322 via the SPIs and OSPI 1 308 or OSPI 2 324. Through crossbar switch 302, ROT 314 is connected to a reserve memory (memory-1 320 through OSPI 1 308 or memory-2 322 through OSPI 2 324) and SP 304 is connected to an active memory (memory-1 320 through OSPI 1 308 or memory-2 322 through OSPI 2 324). In some implementations, one or more ROT's and one or more SP's can be connected among two or more memory parts with two or more associated OSPI's. In some implementations, a high bandwidth bus switch may be employed.

Connector 318 may be a physical wire or virtual wire to bind the ROT 314 with the crossbar switch 302. ROT 314 may send switch signals through connector 318 to the crossbar switch 302, for example, signals to trigger crossbar switch 302 to selectively swap access to OSPI 1 308 for memory-1 320, and access to OSPI 2 324 for memory-2 322.

In particular implementations, each memory part may be a separate flash memory component or system. In other implementations, the memory parts or partitions may be in the same physical system, or may be organized across more than two different memory components (or memory devices if there are multiple) in the background.

In some implementations, the ROT 314 may prepare and configuration the reserve memory, which may further include loading and measuring the OSPI 1 308 and/or OSPI 2 324. For example, the contents of OSPI 1 308 and/or OSPI 2 324 may be read and compared to a known acceptable value.

In some implementations, the ROT can be given alternating access to both memory-1 320 and memory-2 322 so that it can measure and update the OSPI 1 308 and OSPI 2 324 at given time. In one implementation, the crossbar switch 302 permits the ROT 314 to control, e.g. through signals sent from ROT 314 through connector 318, which of OSPI 1 308 or OSPI 2 324 the ROT 314 is connected to, as well as which of OSPI 1 308 or OSPI 2 324 devices is connected to the SP 304.

Figure 4:
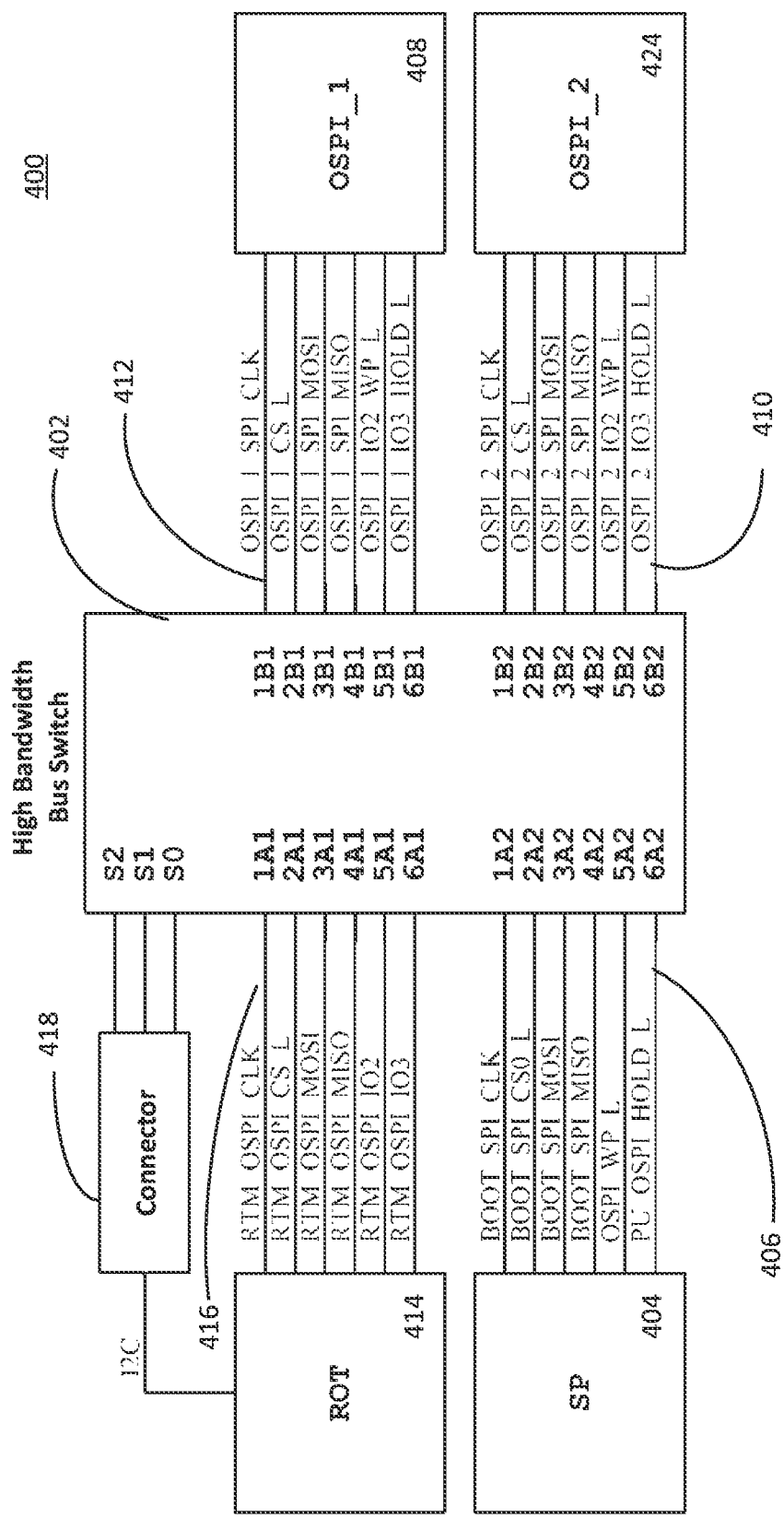
FIG. 4 is a block diagram of the memory restoration system FIG. 3 showing an example of pinouts of a control circuitry in a particular implementation, in accordance with some implementations.

FIG. 4 is a block diagram of exemplary interconnections of possible components in the memory restoration system configuration 400 shown in FIG. 3. For example, a high bandwidth bus switch 402 may be used, such as QS3VH16212 bus exchange hotswitch by Renesas/Integrated Device Technology. A connector 418 may be an input/output expander, such as a 16 bit I/O expander PCA9555 by Texas Instruments, to provide more I/O. In some implementations, the signal expander device may be beneficial if there is a shortage of physical pins in a particular configuration of the memory restoration system 400. For example, a high bandwidth bus switch may require added control bits for additional signals. Other numbers and types of signal expanders or signal connector configurations may be used.

As described above with regards to FIG. 3, interconnections include the switch 402 with multiple pins selectively connecting either the ROT 414 through multiple input lines 416 or the SP 404 through multiple output lines 406, to either of two OSPI devices 408, 424 through multiple lines 410, 412. The OSPI devices 408, 424 enable coupling to respective memory parts (not shown).

Figure 5:
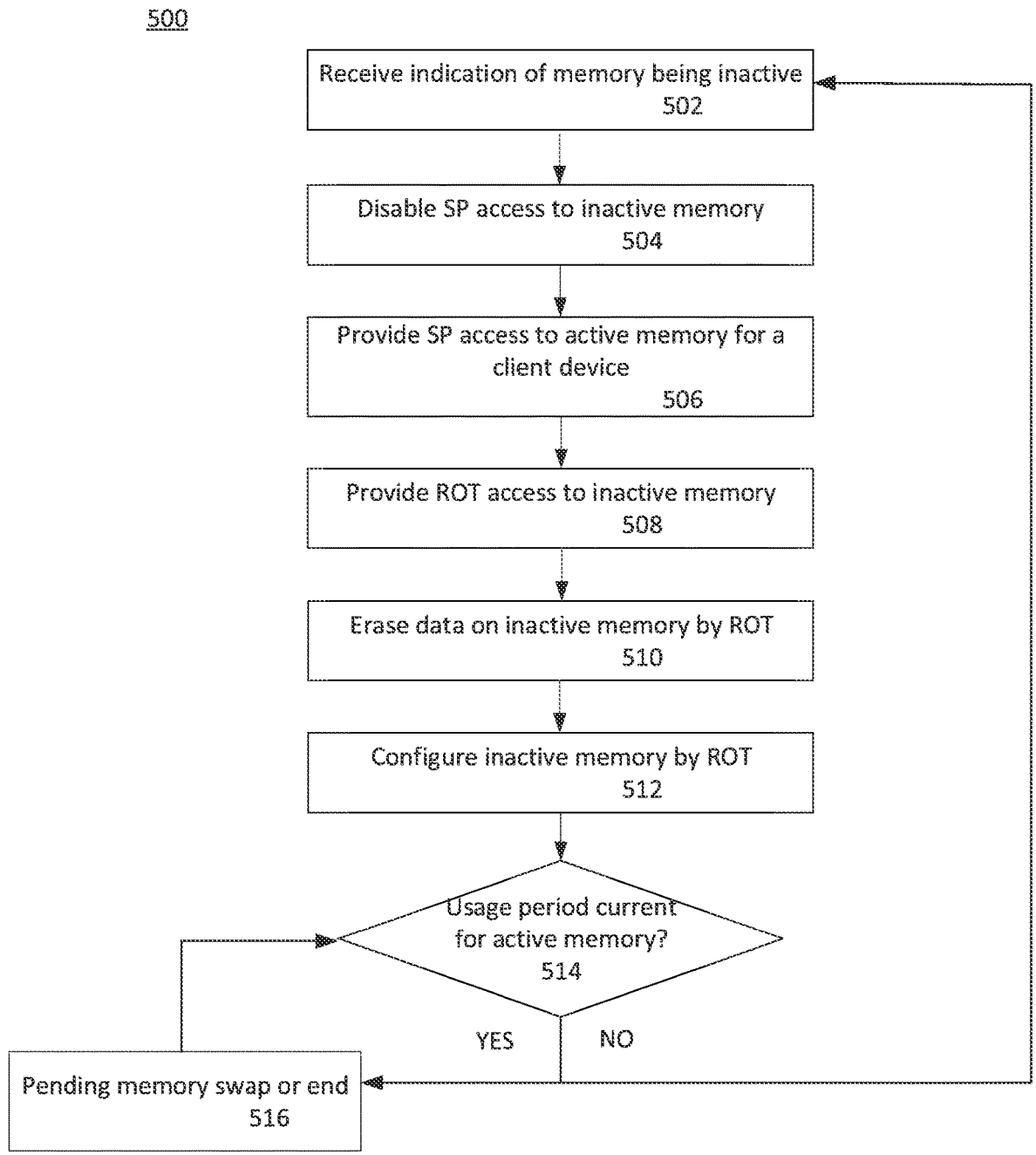
FIG. 5 is a flow diagram of an exemplary method to implement concurrent memory recycling using the memory reservation system, in accordance with some implementations.

FIG. 5 is a flowchart of an exemplary concurrent recycling process 500 to automatically prepare and configure the used memory for reuse. The concurrent recycling process is performed by at least some of the components of memory restoration system (for example, 110 of FIGS. 1*a* and 1*b*, 200 of FIG. 2, or 300 of FIG. 3).

This concurrent recycling may include discovering the physical media, e.g. flash memory returned by a previous user, connected to the host. In block 502, an indication is received of a returned memory part being inactive that had previously been in use by a collection of computing resources, e.g. cloud computing system. The indication may be an internally-generated notification, for example, by the cloud computing system, that a parameter had been reached to terminate a particular user's access to the returned memory. Termination of use may be expiration of a usage period for a particular user, warning of prohibited use of the returned memory, a problem with the memory hardware or software, etc. In some implementations, the indication may be generated by user device, e.g., a submission to the system that the user is finished utilizing the returned memory.

In block 504, a service processor (such as 124 of FIGS. 1*a*, 1*b*; 204 of FIG. 2 and 304 of FIG. 3) is temporarily disabled from accessing the returned inactive memory. The service processor may be disconnected from the inactive memory by a switch (such as 106 of FIGS. 1*a*, 1*b*, 202 of FIG. 2, or 302 of FIG. 3). The service processor is used by a current resident user (such as 104 of FIGS. 1*a*, 1*b*). In block 506, a user connection is provided for the SP to access an active memory part for a client device of the current resident user. The active memory part had already been prepared and configured for use.

The ROT (such as 144 of FIGS. 1*a*, 1*b*; 214 of FIG. 2 and 314 of FIG. 3) may send a switch signal to the switch, triggering the switch to change connections to the memory parts. In block 508, a connection is provided for the ROT to access to the returned inactive memory part.

The ROT may initiate secure erasure by executing the applicable erasure command for the media type. In block 510, data on the returned inactive memory part is erased by the ROT during a preparation stage. During the preparation phase, physical destruction and logical data erasure processes are employed so that data does not persist in restored memory.

In some implementations, when the erasure process is complete, the ROT may start a process to return the used memory to its initial factory state to restore the memory to factory settings prior to a first deployment for a user. The ROT may further test the used memory for faults. If a fault is detected, the used memory may be flagged further investigation.

In block 512, the ROT configures the inactive memory for subsequent user of the service processor. When a computing resource, e.g. bare metal compute server instance, is released by a user or service, the hardware goes through the provisioning process before the returned memory is released to inventory for reassignment. Configuring may include installing and configuring software, including the operating system and applications.

In decision block 514, it is determined whether a usage period current for the active memory is still current, or whether the period had ended. In block 516, if the usage period is still current such that a user is still permitted to use the active memory, the prepared active memory part remains in use and the inactive memory part is maintained as pending for a subsequent user in a memory swap. Otherwise, in some circumstances the process may end, for example if there are no further users, if the memory is found to be too worn for subsequent use, etc. If the usage period is no longer current such that the user is not permitted to continue use of the active memory part, the process returns to block 502 to swap memories and prepare/configure the recently used memory part.

Figure 6:
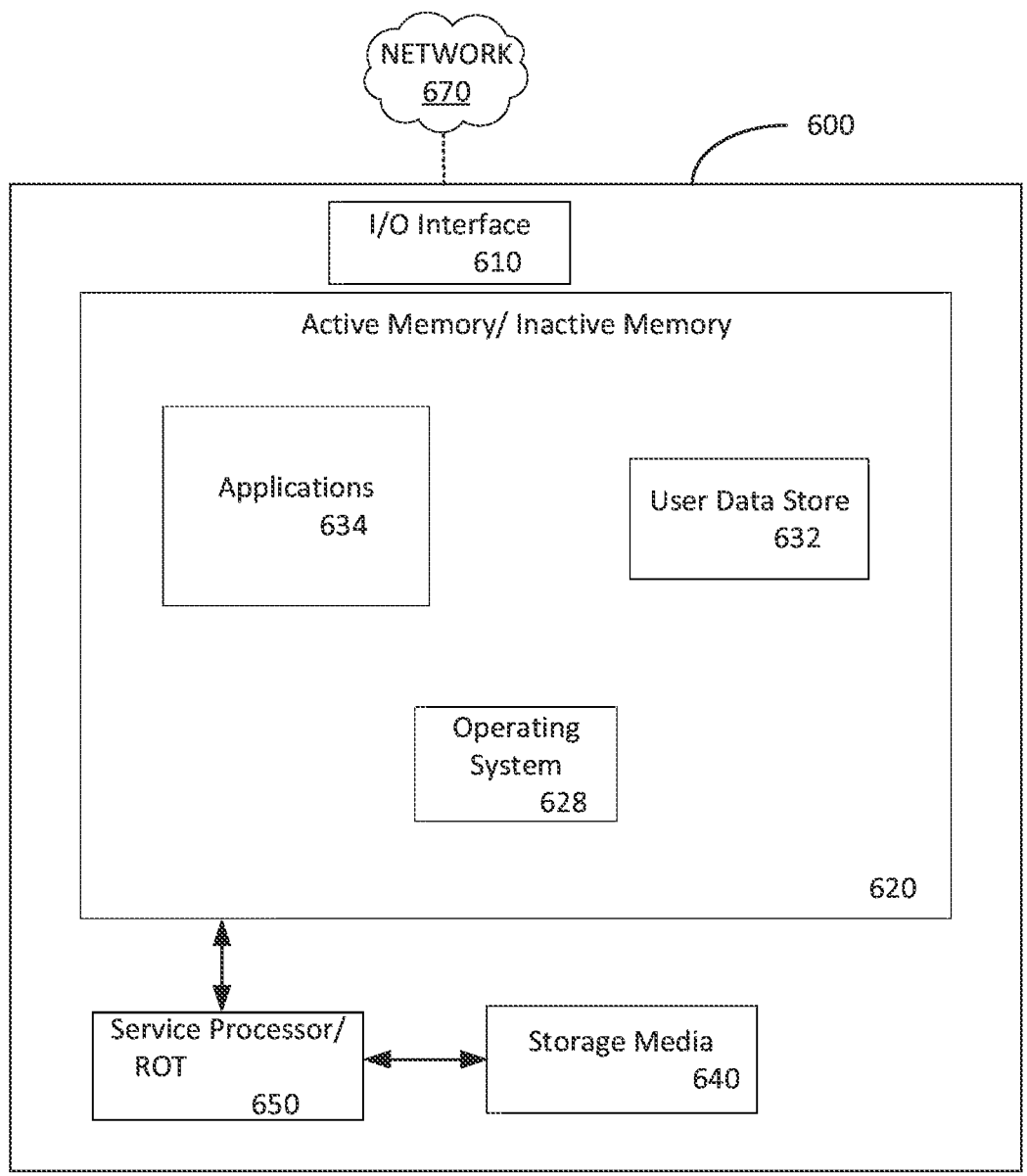
FIG. 6 is a block diagram of an exemplary computing device usable to implement in the memory reservation system of FIGS. 1-4, in accordance with some implementations.

FIG. 6 is a block diagram of an exemplary computer device 600, e.g. a server (such as 120 or 140 of FIG. 1*a* or 1*b*) for use with implementations of the memory restoration system described herein. The computer device 600 may be included in any of the above described computer devices of a collection of computer devices. Computer device 600 is merely illustrative and not intended to limit the scope of the claims. One of ordinary skill in the art would recognize other variations, modifications, and alternatives.

In one exemplary implementation, computer device 600 includes an I/O interface 610, which may represent a combination of a variety of communication interfaces (such as 128 of FIGS. 1*a*, 1*b*). I/O interface 610 may include a network interface. A network interface typically includes a network interface card, an Ethernet card, a modem (telephone, satellite, cable, ISDN), (asynchronous) digital subscriber line (DSL) unit, and the like. Further, a network interface may be physically integrated on a motherboard, may be a software program, such as soft DSL, or the like. In some implementations, the computer device 600 may use a virtual device to substitute for a physical I/O component.

Computer device 600 may also include software that enables communications of I/O interface 610 over a network 670 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 670 may include a local area network, a wide area network, a wireless network, an Intranet, the Internet, a private network, a public network, a switched network, or any other suitable communication network, such as for example Cloud networks. Network 670 may include many interconnected computer systems and any suitable communication links such as hardwire links, optical links, satellite or other wireless communications links such as BLUETOOTH, WIFI, wave propagation links, or any other suitable mechanisms for communication of information. For example, network 670 may communicate to one or more mobile wireless devices 956A-N, such as mobile phones, tablets, and the like, via a base station such as a wireless transceiver.

Computer device 600 typically includes computer components such as a processor 650 as described above (such as service processor 124 and ROT 144 in FIGS. 1a, 1b), and memory storage devices, such as a memory 620, e.g., flash memory as described above and storage media 640. A bus may interconnect computer components. In some implementations, computer device 600 is a server having hard drive(s) (e.g. SCSI) and controller card, server supported processors, network interface, memory, and the like. While a computer is shown, it will be readily apparent to one of ordinary skill in the art that many other hardware and software configurations are suitable for use with the present invention.

Memory 620 and storage media 640 are examples of tangible non-transitory computer readable media for storage of data, files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, cloud storage, and the like. A data store 632 may be employed to store various data such as data saved by a user.

One or more computer programs, such as applications 634, also referred to as programs, software, software applications or code, may also contain instructions that, when executed, perform one or more methods, such as those described herein. The computer program may be tangibly embodied in an information carrier such as computer or machine readable medium, for example, the memory 620, storage device or memory on processor 650. A machine readable medium is any computer program product, apparatus or device used to provide machine instructions or data to a programmable processor.

Computer device 600 further includes operating system 628. Any operating system 628, e.g. server OS, that is supports the fail-over cluster may be employed, e.g. Linux, Windows Server, Mac OS, etc.

Although the description has been described with respect to particular implementations thereof, these particular implementations are merely illustrative, and not restrictive. For example, circuits or systems to implement the functionality described herein may vary widely from the specific embodiments illustrated herein.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus to prepare memories for a fleet of servers, comprising:

a switch operable to be controlled by a root of trust processor to enable a first client device of a first user to access a first memory part at a service front end via a server processor of the fleet of servers at the service front end during a first usage period, and to prohibit access of the first client device to a second memory part at a restoration back end via the root of trust processor at the restoration back end during preparation of the second memory part; and the root of trust processor tasked with memory preparation and deployment, wherein the root of trust processor is configured to prepare the second memory part by installing in the second memory part, data specific for an environment or task of a second client device of a second user while the second memory part is isolated from the server processor, and wherein the root of trust processor is further configured to generate one or more signals to transmit the one or more signals, via a connector providing a dedicated path to the switch to trigger the switch to:

remove access of the first client device to the first memory part upon expiration of the first usage period, and provide access of the second client device to the second memory part via the server processor during a second usage period.

2. The apparatus of claim 1, wherein the root of trust processor further prepares the second memory part by erasing prior data from a previous user of the second memory part.

3. The apparatus of claim 2, wherein the erasing of the prior data includes returning the second memory part to an initial factory state.

4. The apparatus of claim 2, wherein installing the data includes the root of trust processor booting a fresh software image onto the second memory part after erasing the prior data from the previous user.

5. The apparatus of claim 1, wherein installing the data further includes the root of trust processor verifying the installed data for the second client device.

6. The apparatus of claim 1, wherein the switch includes a cross-bar switch with multiple input lines and multiple output lines.

7. A method for providing memory for reuse with a fleet of servers, the method comprising:
   providing a root of trust processor at a restoration back end and tasked with memory preparation and deployment;
   triggering, by the root of trust processor, a switch to enable a first client device of a first user, to access during a first usage period, a first memory part at a service front end via a server processor of the fleet of servers, the server processor being at the service front end, and to prohibit access of the first client device to a second memory part at a restoration back end during preparation of the second memory part;
   installing, by the root of trust processor, the second memory part, data specific for an environment or task of a second client device of a second user while the second memory part is isolated from the server processor;
   removing, by the switch, access of the first client device to the first memory part upon expiration of the first usage period; and
   providing, by the switch, access of the second client device to the second memory part via the server processor during a second usage period.

8. The method of claim 7, wherein the root of trust processor further prepares the second memory part by erasing prior data from a previous user of the second memory part.

9. The method of claim 8, wherein the erasing of the prior data includes returning the second memory part to an initial factory state.

10. The method of claim 8, wherein installing the data includes the root of trust processor booting a fresh software image onto the second memory part after erasing the prior data from the previous user.

11. The method of claim 7, wherein installing the data further includes the root of trust processor verifying the installed data for the second client device.

12. The method of claim 7, wherein the first memory part and the second memory part are a same type of memory.

13. The method of claim 7, wherein the switch includes a cross-bar switch with multiple input lines and multiple output lines.

14. A cloud computing system having a fleet of servers and a memory restoration system for recycling of memory, the cloud computing system comprising:
   a restoration back end, comprising:
      a service processor that is accessible to a first client device of a first tenant user during a first usage period and a second client device of a second tenant user during a second usage period; and
      a first memory part that is accessible to the first client device of the first tenant user during the first usage period; and
      a switch operable to be controlled by a root of trust to enable a first client device of a first user, to access to a first memory part via a server processor of the fleet of servers, and to prohibit access of the first client device to a second memory part during preparation of the second memory part; and
   a restoration back end, comprising:
      a root of trust processor tasked with memory preparation and deployment; and
      the second memory part,
   wherein the root of trust is configured to install in the second memory part, data specific for an environment or task of a second client device of a second user while the second memory part is isolated from the server processor, and
   wherein the root of trust processor is further configured to trigger the switch to:
      remove access of the first client device to the first memory part upon expiration of the first usage period, and
      provide access of the second client device to the second memory part via the server processor during the second usage period.

15. The cloud computing system of claim 14, wherein the root of trust processor further prepares the second memory part by erasing prior data from a previous user of the second memory part.

16. The cloud computing system of claim 15, wherein the erasing of the prior data includes returning the second memory part to an initial factory state.

17. The cloud computing system of claim 15, wherein installing the data includes the root of trust processor booting a fresh software image onto the second memory part after erasing the prior data from the previous user.

18. The cloud computing system of claim 15, wherein installing the data further includes the root of trust processor verifying the installed data for the second client device.

19. The cloud computing system of claim 14, wherein the switch includes a cross-bar switch with multiple input lines and multiple output lines.

20. The apparatus of claim 1, further comprising a connector to provide a dedicated path to the switch for the root of trust processor to transmit the one or more signals to the switch.

* * * * *